Nov. 5, 1940.  H. Y. HAZEL  2,220,240
BEET TOPPING MACHINE
Filed Jan. 5, 1939  3 Sheets-Sheet 1
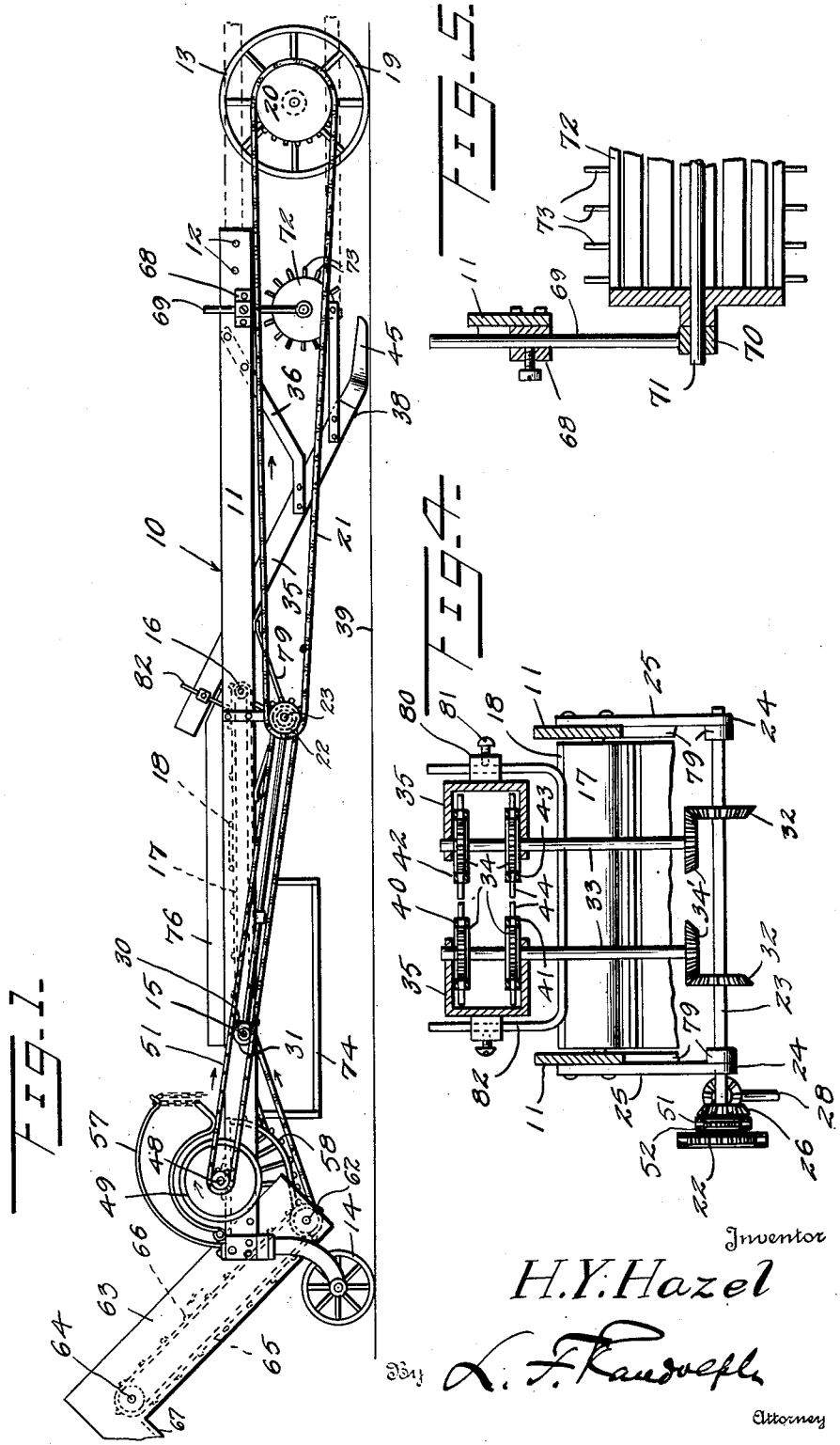
Inventor
H. Y. Hazel
By L. F. Randolph
Attorney

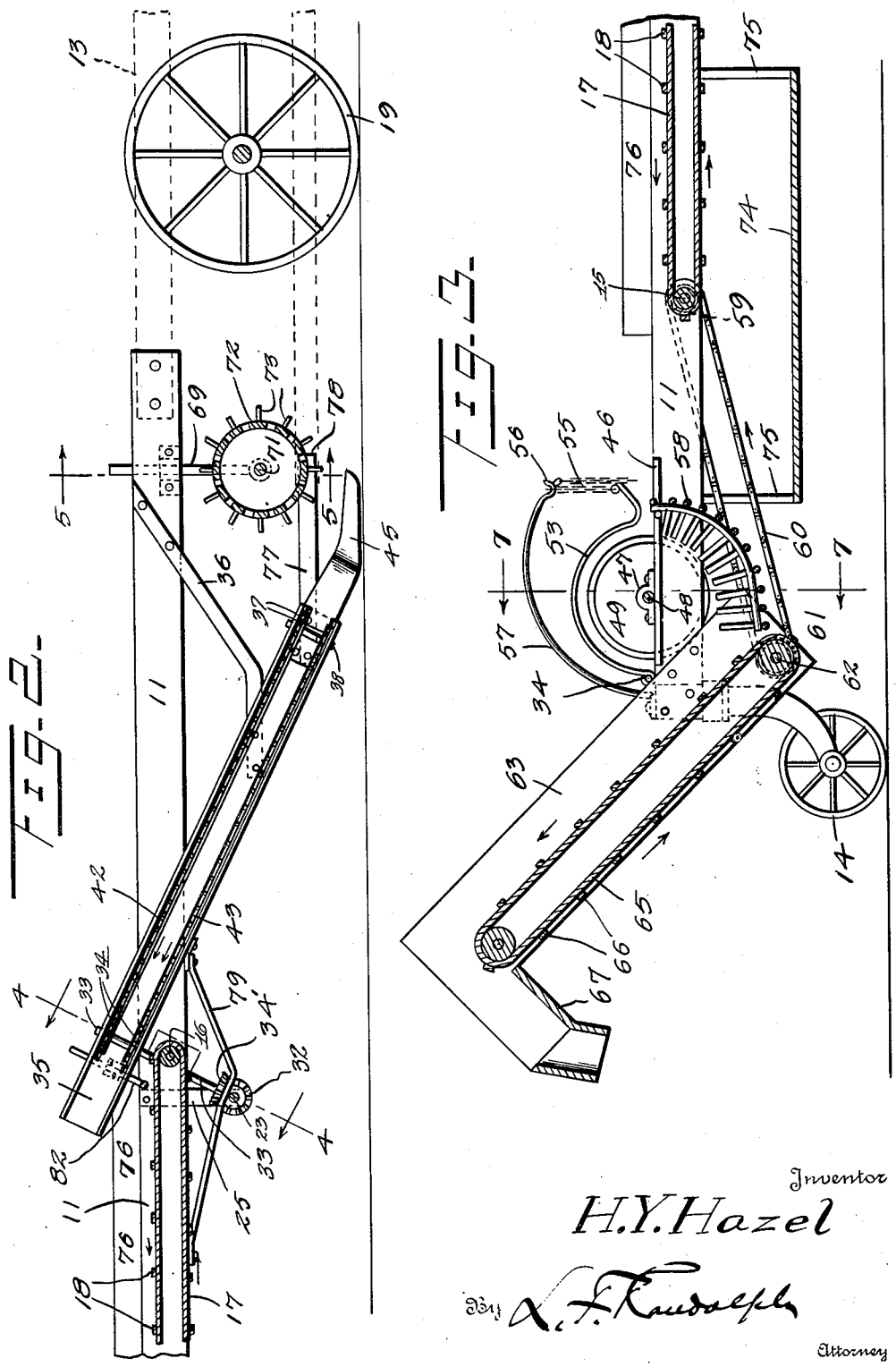

Nov. 5, 1940.  H. Y. HAZEL  2,220,240
BEET TOPPING MACHINE
Filed Jan. 5, 1939  3 Sheets-Sheet 3
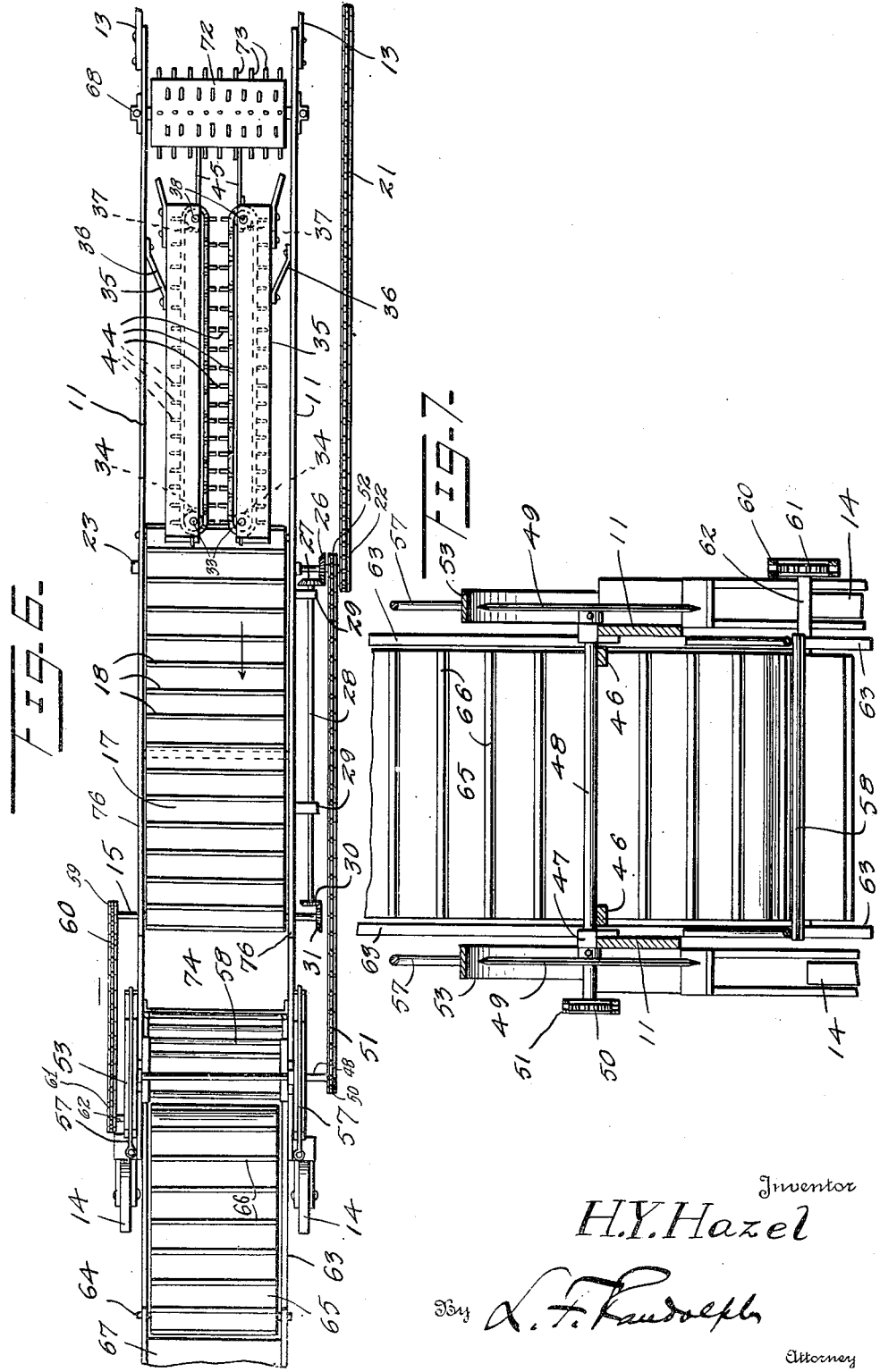
Inventor
H. Y. Hazel
By L. F. Randolph
Attorney Patented Nov. 5, 1940

2,220,240

UNITED STATES PATENT OFFICE 2,220,240

BEET TOPPING MACHINE

Henry Y. Hazel, Wichita, Kans.

Application January 5, 1939, Serial No. 249,513

7 Claims. (Cl. 55—9)

This invention relates to an improved machine adapted for use in harvesting various forms of vegetables such as carrots, parsnips, onions and the like, and particularly adapted for harvesting beets.

It is a particular aim of this invention to provide a machine adapted to be connected to and drawn by a beet pulling machine and to be actuated by a ground wheel thereof for lifting the uprooted beets, or other vegetables, out of the earth and conveying them to a platform where workmen may conveniently handle the beets and present them to rotary knives for cutting the tops or foliage from the beets, after which the beets are carried upwardly and dumped into a wagon or the like.

More particularly, it is an aim of this invention to provide a beet topping machine of the trailer type which may be readily connected to beet pulling machines of various constructions and having power take-off means adapted to be connected by a sprocket and a chain to a ground wheel of the beet puller whereby the various driven parts of the topping machine can be actuated simultaneously therefrom.

Topping machines generally lift the beets partly out of the earth leaving them standing loosely, and it is a particular aim of this invention to provide inclined elevating means adapted to grasp the beets and to convey them upwardly and onto the machine.

Other objects and advantages of the invention will hereinafter become more fully apparent from the following description of the drawings, which illustrate a preferred embodiment thereof, and wherein—

Figure 1 is a side elevational view showing the machine attached to the rear end of a beet puller or lifter, Figure 2 is an enlarged longitudinal vertical sectional view of the forward end of the machine, Figure 3 is a similar view of the rear end of the machine, Figure 4 is a sectional view taken along the line 4—4 of Figure 2, Figure 5 is a vertical sectional view taken along the line 5—5 of Figure 2, Figure 6 is a top plan view of the machine, and Figure 7 is a vertical sectional view taken along the line 7—7 of Figure 3.

Referring more particularly to the drawings, wherein like reference characters designate like or corresponding parts throughout the different views, 10 designates generally the beet topping machine which comprises a frame formed of the spaced parallel sills 11 connected at their forward ends by the fastenings 12 to a beet pulling machine, the rear end of which is shown at 13. The opposite end of the machine 10 is supported by the caster wheels 14 which are swivelly connected to the rear ends of the sills 11.

A pair of shafts 15 and 16 are journaled in the sills 11 intermediate of their ends and disposed in spaced relationship to each other to mount an endless conveyor belt 17 which is trained over these shafts and which is provided with the spaced transverse bars 18.

The rear end of the pulling machine 13 is supported by the wheels 19 which are keyed to an axle to which is keyed the sprocket wheel 20 which drives the endless chain 21 which is connected to a sprocket 22 keyed to one end of a shaft 23 which is journaled in the bearings 24 supported by hangers 25 secured to sills 11 adjacent their forward ends. Connected to shaft 23 adjacent the sprocket 22 is a beveled gear 26 which meshes with a beveled gear 27 keyed to one end of shaft 28 which is journaled in the bearings 29 which are secured to one of the sills 11. A beveled gear 30 keyed to the opposite end of shaft 28 meshes with a beveled gear 31 keyed to one end of shaft 15 for driving belt 17, in the direction as indicated by the arrow in Figure 6, when the topping machine 10 is pulled by the beet puller 13.

As best seen in Figure 4, a pair of beveled gears 32 are keyed to the shaft 23 and between the bearings 24 to drive the shafts 33 to which they are connected by the beveled gears 34' in opposite directions as indicated by the arrows, in this figure. Keyed to each of the shafts 33 and disposed in spaced relationship to each other, are a pair of sprocket wheels 34 arranged with the upper and lower sprocket wheels of each shaft in parallel relationship, as seen in Figure 4. Shafts 33 are journaled in the opposite sides of the channel shaped members 35 which are supported in an inclined position, as seen in Figure 1, by the braces 36 and which are arranged with their open sides facing each other, as seen in Figure 4. Corresponding sprockets 37 are keyed to shafts 38 which are journaled in the lower ends of the channel members 35, which are disposed adjacent the ground level, designated 39, in Figure 1.

Endless chains 40, 41, 42 and 43 are trained over the corresponding chain sprockets of the shafts 33 and 38 with the chains 40 and 41 and the chains 42 and 43 arranged in superimposed relationship, as best seen in Figure 4, and with the chains 40 and 42 and the chains 41 and 43 disposed in a plane parallel to each other. Each of these chains is provided with a plurality of spaced outwardly projecting spikes 44 which are in alinement so that the spikes of chains 40 and 42, the portions of the chains which are adjacent to each other, have their free ends slightly spaced from each other and this is likewise true for the spikes of chains 41 and 43, as best seen in Figures 4 and 6. The spikes of chains 41 and 43 are also so arranged that each pair of these spikes are beneath a pair of the spikes projecting from the chains 40 and 42 while the spikes are in adjacent relationship.

Members 35 at their lower ends are provided with the shoes 45 which are positioned to be substantially in engagement with the earth, as indicated by the lines 39, to guide uprooted beets into position to be engaged by the spikes 44.

Shelves 46 are mounted on the sills 11 adjacent their rear ends to provide a support for the bearings 47 which journal the transverse shaft 48 to which are keyed the rotary knives 49 one of which is disposed on the outer side of each of the sills 11 and adjacent thereto. A sprocket wheel 50 is keyed to one end of the shaft 48 and is connected by a chain 51 to a sprocket 52 connected to shaft 23 so that the knives 49 will be driven in the direction as indicated by the arrow in Figure 1, through connection with chain 21 when the beet puller 13 moves forwardly.

Arcuately shaped resilient guards or shields 53 are positioned over the upper halves of the knives 49 and are secured to the sills 11 at 54 behind the knives 49 with their forward free ends turned upwardly and adjustably connected by chains 55 to the hooked ends 56 of the rods 57 which adjustably position shields 53 relatively to the cutting edges of the knives 49.

Between and beneath the knives 49 and supported by the sills 11 is a curved downwardly extending bottom 58 formed of rods which are arranged in spaced relationship and provided with upwardly extending spikes at their ends forming sides, for a purpose which will hereinafter be described.

Shaft 15 on its free end is provided with a sprocket wheel 59 which is connected by a chain 60 to the sprocket wheel 61, which is secured to shaft 62. Shaft 62 is journaled in the side rails 63 which are secured to the rear ends of sills 11 and which extend downwardly and upwardly therefrom and which are disposed diagonally to the plane of the machine 10. The shaft 62 is journaled in the lower ends of the rails 63 and a shaft 64 is journaled adjacent the upper ends of these rails to mount an endless belt elevator 65 which is trained over these shafts and which is provided with the transverse slats 66 on its outer side. Rails 63 at their upper ends mount an outlet or spout 67 which opens downwardly behind the machine 10.

Referring particularly to Figure 5, sleeves 68 provided with set screws are secured in opposed relationship to the sills 11 adjacent their forward ends to adjustably support the vertically disposed rods 69 having the bearings 70 on their lower ends to support and journal the shaft 71 to which is keyed a drum 72 having a number of rows of outwardly projecting spikes 73. Drum 72 is disposed slightly in front of and adjacent to the shoes 45 and may be raised or lowered relatively thereto by adjusting the rods 69 relatively to sleeves 68. Drum 72 is only adapted for use where the vegetables to be topped by the machine 10 have excessive foliage and is adapted to be actuated by this foliage and revolved so that the spikes 73 will remove a substantial portion of the top or foliage of the vegetable before it is lifted out of the ground by engagement with the spikes 44.

Between the conveyor 17 and the bottom 58 is provided a platform 74 which is suspended beneath and between the sills 11 by the hangers 75 connected thereto for supporting workmen, as will hereinafter be explained. Sills 11 contiguously with conveyor 17 may be provided with the upwardly extending rails 76 which project above the upper side of conveyor 17 to prevent the vegetables carried thereby from falling off the sides of the machine 10. The forward lower ends of the channel shaped members 35 are held in proper position relatively to the earth's surface 39 by the braces 77 which are secured thereto and to a portion of the machine 13 as indicated at 78. As best seen in Figure 2, a pair of braces 79 are secured to the lower edges of the sills 11 at their ends and co-act with the hangers 25 in journaling the shaft 23 and also to maintain shaft 23 in proper relative position to the channel members 35 so that gears 32 and 34 will be held in mesh. A U-shaped rod 82 is supported by the sleeves 80 having the set screws 81 and which are secured to the outer sides of the members 35 adjacent their upper ends to adjustably support the intermediate portion of rod 82 beneath and adjacent to the upper ends of the members 35, for a purpose which will hereinafter be explained. The beet puller 13 may be of any conventional construction to function in the conventional manner to raise or uproot the beets, not shown, so that they stand loosely in the earth to be thereafter engaged by the machine 10 as follows: machine 10 is connected to the rear end of the puller 13 and so positioned that the shoes 45 will move on opposite sides of the row of beets to direct them inwardly and into engagement with spikes 44. Each beet will be engaged between four of the spikes 44 and lifted thereby out of engagement with the earth 39 and carried upwardly to a point above the sills 11. The beets will be held by the spikes 44 with the foliage or tops extending upwardly and the beet roots will engage the intermediate portion of the rod 82 at about the time that the beet is released by the spikes 44 thereby causing the beet to tumble onto the conveyor 17 with the foliage to the front. Conveyor 17 will carry the beet to a workman standing on platform 74 who will grasp the beet and push it between the free end of one of the shields 53 and the shelf 46 thereby raising said free end and exposing the beet to one of the knives 49 which are being revolved by the forward movement of the machine 10, as heretofore explained. The beets are positioned with the foliage outwardly and the roots inwardly when presented to the knives 49 so that when the crown of the beet is cut-off both the foliage and roots may be released by the operator to allow the foliage to drop to one side of the machine and the roots to fall onto the rods of the bottom 58 from where they will roll onto the lower end of the conveyor 65. The open framework of the bottom 58 allows any dirt still on the roots to be shaken off and to fall between the bars onto the ground. The root will be engaged by one of the slats 66 and carried upwardly on the belt 65 and released into the spout 67 from whence it will drop into a wagon or the like, not shown, which may be attached to the rear end of the machine 10.

While the machine 10 has been described, for the most part, in connection with the topping of beets it is obviously equally well adapted for topping other root vegetables having green foliage which is ordinarily considered as waste such as parsnips, onions, rutabaga or the like.

Various modifications and changes in the construction and arrangement of the parts forming the invention are contemplated and may be resorted to and the right is therefore reserved to make such changes and variations as do not depart from the spirit and scope of the invention as hereinafter defined by the appended claims.

I claim as my invention:—

1. A vegetable topping machine comprising a frame adapted to be connected and supported at its forward end on the rear end of a beet puller, the opposite end of said frame being supported by casters, inclined chain conveying and elevating means adjacent the forward end of said frame adapted to engage pulled standing vegetables for conveying them upwardly to a point adjacent the top of said frame, an endless conveyor moving longitudinally of said frame and having one end positioned to receive the vegetables from the chain conveying and elevating means, an adjustably mounted rod disposed between the first and last mentioned conveyors for engaging the roots of the vegetables to cause them to tumble onto the endless conveyor, knives disposed adjacent the opposite end of said conveyor for cutting the tops or foliage from the vegetables, an inclined bottom beneath and to one side of said knives for receiving said vegetables, and an elevator having its lower end disposed adjacent the lower end of said bottom to receive the vegetables therefrom and for conveying them upwardly and into a wagon or the like.

2. A machine as in claim 1, and driving means connecting said elevators, conveyor and knives to a ground wheel of the draft vehicle.

3. A machine as in claim 1, and a beater adjustably mounted on said frame adjacent its forward end and forward of the chain conveying and elevating means for beating the excess foliage from the pulled vegetables.

4. A beet topping machine adapted to be connected and drawn by a beet pulling machine and comprising an endless conveyor moving longitudinally of said machine, endless elevating means having teeth for engaging beets, that have been raised by said pulling machine, for carrying said beets upwardly and onto said conveyor adjacent its forward end, rotary knives at the opposite end of said conveyor for cutting the foliage from said beets, and an elevator for conveying the beets from said machine to a wagon or the like, and a concave bottom, formed of spaced rods, disposed adjacent said knives to receive said beets and to direct them onto the elevator.

5. A beet topping machine comprising in combination with means for conveying and cutting the foliage from beets, elevating means comprising pairs of endless chains, arranged in opposed relationship and moving in opposite directions with the chains of each pair arranged in superposed spaced relationship, said chains being provided with outwardly projecting spikes adapted to engage and lift the beets out of the earth and to convey them upwardly and onto said endless conveyor, each of the beet roots being supported between four of said spikes.

6. A vegetable topping machine including means for lifting pulled vegetables out of the earth and for carrying said vegetables upwardly and onto an endless conveyor, said means including pairs of superposed moving chains having outwardly projecting spikes, the upper and lower chains of each pair being arranged in parallel opposed relationship, and means for driving said pairs of chains in opposite directions whereby the spikes may be actuated to co-act in engaging and carrying the vegetables, with each vegetable root supported between four of the spikes.

7. A beet topping machine comprising a machine including a frame formed of a pair of spaced longitudinal sills adapted to be connected at their forward ends to a beet pulling machine and provided with supporting wheels at their rear ends, shafts journaled in said sills intermediate of their ends and in spaced apart relationship to each other, an endless belt conveyor trained over said shafts, driving means connecting one of said shafts to a ground wheel of the beet puller for operating said conveyor, four endless chains connected to and actuated by said driving means and provided with sets of co-acting spikes for engaging and lifting pulled beets from the earth and for conveying said beets to the forward end of said conveyor, the root of each beet being engaged and supported between four of the spikes, rotary knives connected to said driving means and mounted on said sills adjacent the opposite end of said conveyor for cutting the foliage therefrom, and means connected to said driving means for conveying the beets from said knives to a wagon or the like.

HENRY Y. HAZEL.